S. INGERSOLL, A. H. ELLIOTT, H. C. SERGEANT & G. R. CULLINGWORTH.
Steam-Engines for Rock-Drills, &c.

No. 147,403.　　　　　　　　　　　　　Patented Feb. 10, 1874.

Witnesses:

Rutledge Wilson
H. McCormick

Inventor:
1st Simon Ingersoll
4th George R. Cullingworth
3rd Henry C. Sergeant
2nd Aroid H. Elliott
by their attys.
A. H. & R. H. Evans.

UNITED STATES PATENT OFFICE.

SIMON INGERSOLL, AROID H. ELLIOTT, HENRY C. SERGEANT, AND GEORGE R. CULLINGWORTH, OF NEW YORK, N. Y.

IMPROVEMENT IN STEAM-ENGINES FOR ROCK-DRILLS, &c.

Specification forming part of Letters Patent No. 147,403, dated February 10, 1874; application filed September 16, 1873.

*To all whom it may concern:*

Be it known that we, SIMON INGERSOLL, AROID H. ELLIOTT, HENRY C. SERGEANT, and GEORGE R. CULLINGWORTH, all citizens of New York, in the State of New York, have invented certain new and useful Improvements in Steam-Engines for Rock-Drills, &c.; and we hereby declare the following to be a full, clear, and exact description thereof, reference being made to the accompanying drawings, forming a part of this specification, in which—

Figure 1:
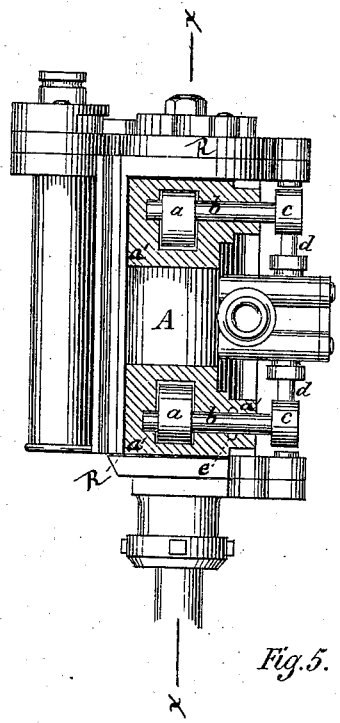
Figure 2:
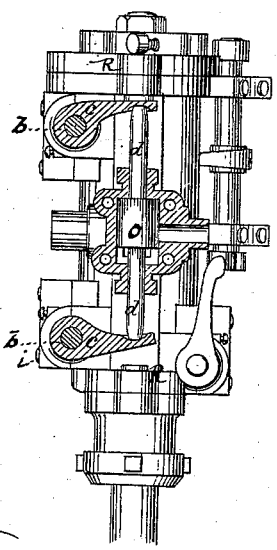
Figure 3:
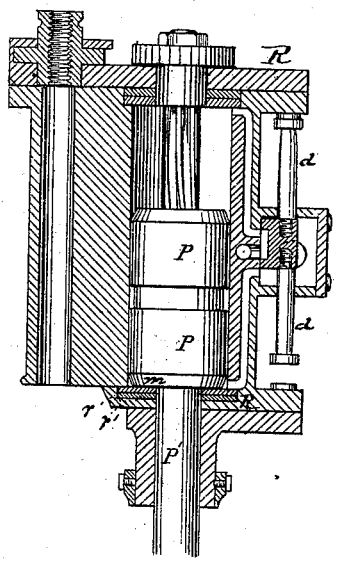
Figure 4:
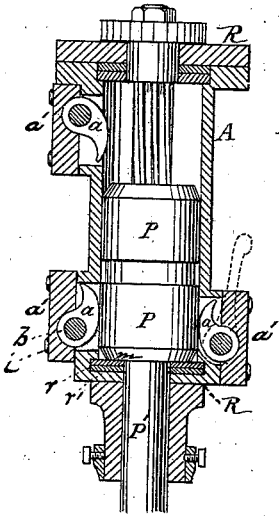

Figure 1 is a side elevation. Fig. 2 is a horizontal section through the steam-chest. Fig. 3 is a section on the line $y\ y$. Fig. 4 is a section on the line $x\ x$.

Our invention has for its object to provide a steam-engine best adapted for working rock-drills when the drill is attached directly to the piston-rod; and it is an improvement on the patent to Simon Ingersoll, dated May 30, 1871, numbered 115,478. It consists in the shape and arrangement of the tappet, in the manner of applying a cushion to the cylinder-heads, and in the manner of packing the rods operating the tappets.

In our said invention, the steam-chest S, cylinder A, piston P, and piston-rod P' all have the ordinary relation to each other. The boxes $a'\ a'$ are arranged on and open into the cylinder at the places as shown in the drawing, for the accommodation of the tappets $a\ a$, which are operated by the piston P, and these tappets in turn operate the slide-valve and feed-motion through suitable mechanism. The tappets $a\ a$ are cam-shaped, and are actuated by the piston P as it travels back and forth, striking them alternately, and giving them a partial rotary motion. The tappets are attached to spindles or rods $b\ b$, which pass to the outside of the cylinder, and on which are secured the arms $c\ c$ to operate the valve-stems $d\ d$.

Heretofore the tappets within the cylinder have been struck by the piston at an angle of about forty-five degrees to the line of travel of the piston, as will be seen in the patent referred to. This arrangement and shape of the tappets produced a sudden and destructive shock to the machinery.

The tappets as now shown, (see Fig. 4,) have their line of contact nearly parallel to the stroke of the piston, and the destructive jar incident to the old method is entirely avoided.

Figure 5:
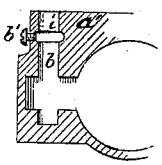

Heretofore great difficulty has been experienced in keeping the tappet-rods $b\ b$ steam-tight; but we have obviated the difficulty by cutting a groove, $e$, in the box $a'$ around the bearing for the rod. (See Fig. 1.) This groove communicates with a hole, $i$, leading from the outside of the box, and secured by a screw. Suitable packing is inserted through the hole $i$, and pressed into position by the screw $b'$, inserted in the hole. (See Fig. 5.)

Experience proves that where this class of drills has been used the valve-stem $d\ d$ is liable to break, very frequently causing great delay, annoyance, and expense. This we avoid by making the stem in two pieces, as shown in Fig. 2, each piece bearing loosely against the valve $o$ and the arms $c\ c$; hence the stems and valve have a loose rebound when the drill has made its blow.

When the drill strikes a seam in the rock, or comes in contact with very soft rock, the momentum given to the piston will throw it with great force against the head of the cylinder, and in many instances knock it out, or permanently injure it. To prevent this, we construct an elastic cushion at the end of the cylinder, as follows: The cylinder ends are reamed out, as shown at $m\ m$. A steel ring, $r$, is fitted snugly into the enlargement, and then a rubber ring, $r'$, is placed upon it. The cylinder-head is then screwed on, and the cushion is complete.

It is evident that should the drill strike a seam in the rock, and the momentum carry the piston too far, it will strike against the steel ring lying on the rubber packing without injury to the cylinder.

Having thus described our invention, what we claim as new, and desire to secure by Letters Patent, is—

1. The cam-shaped tappets $a\ a$, rods $b\ b$, and arms $c\ c$, in combination with the piston P, substantially as and for the purpose set forth.

2. The grooves $e$, arranged as described, in combination with the hole $i$ for receiving and holding the packing, substantially as set forth.

3. The cylinder recessed at $m\ m$, in combination with the steel ring $r$ and rubber cushion $r'$, piston-head P, and cylinder-head R, all constructed and arranged as set forth.

SIMON INGERSOLL.
GEORGE R. CULLINGWORTH.
HENRY C. SERGEANT.
AROID H. ELLIOTT.

Witnesses:
ISAAC SANNENBERG,
H. HINMAN,
JOS. E. BOSS.